(12) United States Patent
Engelhardt et al.

(10) Patent No.: US 6,580,554 B2
(45) Date of Patent: Jun. 17, 2003

(54) METHOD FOR BEAM CONTROL IN A SCANNING MICROSCOPE, ARRANGEMENT FOR BEAM CONTROL IN A SCANNING MICROSCOPE, AND SCANNING MICROSCOPE

(75) Inventors: Johann Engelhardt, Bad Schoenborn (DE); Werner Knebel, Kronau (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 61 days.

(21) Appl. No.: 09/974,014

(22) Filed: Oct. 10, 2001

(65) Prior Publication Data

US 2002/0041439 A1 Apr. 11, 2002

(51) Int. Cl.⁷ .............................................. G02B 21/00
(52) U.S. Cl. ....................... 359/368; 359/369; 359/370; 359/373
(58) Field of Search ................................. 359/368, 369, 359/370, 373, 202, 203, 861, 862; 250/458.1, 459.1, 461.1, 235, 234

(56) References Cited

U.S. PATENT DOCUMENTS 4,827,125 A * 5/1989 Goldstein .................... 250/234
4,863,226 A * 9/1989 Houpt et al. ................. 359/212
4,893,008 A * 1/1990 Horikawa .................... 250/234
6,211,988 B1   4/2001 Engelhardt et al. ......... 359/201
6,429,897 B2 * 8/2002 Derndinger et al. ......... 348/295
6,462,345 B1 * 10/2002 Simon et al. ............. 250/458.1

FOREIGN PATENT DOCUMENTS

DE           19654210          6/1998

* cited by examiner

Primary Examiner—Mohammad Sikder
(74) Attorney, Agent, or Firm—Davidson, Davidson & Kappel, LLC (57) ABSTRACT

A method and an arrangement for beam control in a scanning microscope are disclosed. The scanning microscope comprises means for acquiring and displaying (3) a preview image (7) and a microscope optical system (51). Means for marking (5) at least one region of interest (27, 29) in the preview image (7) are provided. A first beam deflection device (43, 67, 68) displaces the scan field (31, 33) onto the region of interest (27, 29); and a second beam deflection device (49, 72, 94) serves for meander-shaped scanning within the scan field (31, 33).

23 Claims, 6 Drawing Sheets

METHOD FOR BEAM CONTROL IN A SCANNING MICROSCOPE, ARRANGEMENT FOR BEAM CONTROL IN A SCANNING MICROSCOPE, AND SCANNING MICROSCOPE

CROSS REFERENCE TO RELATED APPLICATIONS

This invention claims priority of the German patent application 100 50 529.5 which is incorporated by reference herein.

FIELD OF THE INVENTION

The invention concerns a method for scanning individual regions with a scanning microscope, the regions of interest being distributed over the entire image field. It is possible to switch rapidly between the individual regions of interest while maintaining the scanning motion. The scanning motion can be accomplished by way of a suitable motion of a scanning mirror.

The invention further concerns an arrangement for beam control in scanning microscopy.

In addition, the invention concerns a scanning microscope that comprises an arrangement for beam control which makes it possible to switch rapidly between the individual regions of interest while maintaining the scanning motion. The scanning microscope can also be configured as a confocal scanning microscope. In particular, in the scanning microscope a light beam produced by an illumination system is guided over a specimen with the interposition of several optical means, and it contains at least one detector that, by way of the several optical means, detects a light proceeding from the specimen.

BACKGROUND OF THE INVENTION

In scanning microscopy, a sample is illuminated with a light beam in order to observe the reflected or fluorescent light emitted from the sample. The focus of the illuminating light beam is moved in a specimen plane by means of a controllable beam deflection device, generally by tilting two mirrors, the deflection axes usually being at right angles to one another so that one mirror deflects in the X and the other in the Y direction. The tilting of the mirrors is brought about, for example, using galvanometer positioning elements; both fast resonant galvanometer positioning elements and slower (more accurate) non-resonant ones are used. In order to scan a sample in the specimen plane, it is important that the rotation axes of the mirror lie in or at least near a plane, also referred to as the Fourier plane, conjugated with the focal plane. One possible beam deflection device that meets the requirements for telecentric imaging is known, for example, from DE 196 54 210. The power level of the light coming from the specimen is measured as a function of the position of the scanning beam. Usually the positioning elements are equipped with sensors for ascertaining the present mirror position.

In confocal scanning microscopy specifically, a specimen is scanned in three dimensions with the focus of a light beam.

A confocal scanning microscope generally comprises a light source, a focusing optical system with which the light of the source is focused onto a pinhole (called the excitation stop), a beam splitter, a beam deflection device for beam control, a microscope optical system, a detection stop, and the detectors for detecting the detected or fluorescent light. The illuminating light is coupled in via a beam splitter. The fluorescent or reflected light coming from the specimen arrives via the beam deflection device back at the beam splitter, passes through it, and is then focused on the detection stop behind which the detectors are located. Detected light that does not derive directly from the focus region takes a different light path and does not pass through the detection stop, thus yielding a point datum that results, by sequential scanning of the specimen, in a three-dimensional image. A three-dimensional image is usually obtained by acquiring image data in layers.

Ideally, the track of the scanning light beam on or in the specimen describes a meander that fills the entire image field (scanning one line in the X direction at a constant Y position, then stopping the X scan and slewing by Y displacement to the next line to be scanned, then scanning that line in the negative X direction at constant Y position, etc.). At high beam deflection speeds, deviations from the ideal track occur because of the inertia of the deflecting moving parts, for example the galvanometer shaft and the mirrors. At usable scanning rates (>100 Hz) the scanning track of the light beam actually describes a sine curve, which in fact a necessitates a correction of the deviations from the ideal situation resulting therefrom.

The power level of the light coming from the specimen is measured at fixed time intervals during the scanning operation, and thus scanned one grid point at a time. The reading must be unequivocally associated with the pertinent scan position so that an image can be generated from the measured data. Advantageously this is done by also continuously measuring the status data of the adjusting elements of the beam deflection device, or (although this is less accurate) by directly using the reference control data of the beam deflection device.

In some microscopy applications the user is interested only in information about individual regions within the image field, while the surrounding sample regions are not of interest. The regions of interest should moreover be scanned as quickly as possible in succession.

Known arrangements offer only a limited capability for scanning individual sample regions of interest. Scanning the entire image field and subsequently selecting the data of the regions of interest is feasible, if at all, only to a limited extent given the required rapid sequential acquisition of information about the regions of interest.

The approach of sequentially scanning the individual regions of interest is better. It is possible in principle to activate the beam deflection device in such a way that each of the regions of interest is separately scanned, for example, in meander fashion, and the surrounding regions that are not of interest are not scanned. This procedure is possible, however, only if the beam deflection device allows the scanning light beam to be specifically controlled and specifically directed onto individual points in the image field.

This is not possible when using resonantly operating beam deflection devices which are based, for example, on the use of resonant galvanometers or micromirrors, because these beam deflection devices operate exclusively at the particular resonant frequency dictated by their design. It is not possible to "park" the light beam in one region of the image field. Difficulties also occur with rapidly deflecting non-resonantly operating beam deflection devices in terms of the positionability that can be achieved, since the positioning elements react to an activation signal in delayed fashion because of their inertia.

SUMMARY OF THE INVENTION

It is therefore the object of the invention to describe a method for scanning microscopic preparations with a light beam that solves the problem described above.

This object is achieved by way of a method that comprises the following steps:

acquiring a preview image;

marking at least one region of interest in the preview image;

displacing a scan field onto the region of interest by means of a first beam deflection device; and acquiring an image by meander-shaped scanning of the region of interest with a second beam deflection device.

What has been recognized according to the present invention is that it is not necessary to forgo the use of fast or resonant beam deflection devices if the scan field swept by the first beam deflection device is displaced within the image field onto the regions of interest with the aid of a further suitable beam deflection device that allows exact positioning.

A further object of the invention is to create an arrangement for beam control which makes it possible to switch rapidly among several regions of interest and, in that context, to collect information from regions of interest based on a consistent pattern.

This object is achieved by an arrangement for beam control in a scanning microscope. The arrangement comprises:

a scanning microscope defining a scan field;

means for acquiring and displaying a preview image a microscope optical system;

means for marking at least one region of interest in the preview image;

a first beam deflection device for displacing the scan field onto the region of interest; and a second beam deflection device for meander-shaped scanning within the scan field.

In a particular embodiment, according to the present invention an imaging optical system is provided between the beam deflection devices in order to guarantee the principle of telecentric scanning.

A further object of the invention is to create a scanning microscope that makes possible rapid sequential scanning of sample regions of interest.

This object is achieved by a scanning microscope which comprises:

an arrangement for beam control, means for acquiring and displaying a preview image a microscope optical system, means for marking at least one region of interest in the preview image, a first beam deflection device for displacing the scan field onto the region of interest; and a second beam deflection device for meander-shaped scanning within the scan field.

The invention has the advantage that it is not necessary to forgo the use of fast or resonant beam deflection devices if the scan field swept by the first beam deflection device is displaced within the image field onto the regions of interest with the aid of a second suitable beam deflection device that allows exact positioning. Ideally, the track of the scanning light beam on or in the specimen describes a rectangular curve (scan one line in the X direction at a constant Y position, then stop the X scan and slew by Y displacement to the next line to be scanned, then scan that line in the negative X direction at constant Y position, etc.). At increasingly high deflection speeds, the scanning track deviates more and more from the rectangular shape. This phenomenon is attributable substantially to the inertia of the moving elements. With rapid scanning, the scanning track is more similar to a sine curve. In this context, the scan field is swept by the light beam in such a way that the reversing points of the sinusoidal track lie outside the region of interest. The scanning light beam thus describes approximately straight tracks on the region of interest.

BRIEF DESCRIPTION OF THE DRAWINGS

The subject matter of the invention is depicted schematically in the drawings and will be described below with reference to the Figures, in which.

DETAILED DESCRIPTION OF THE INVENTION

Figure 1:
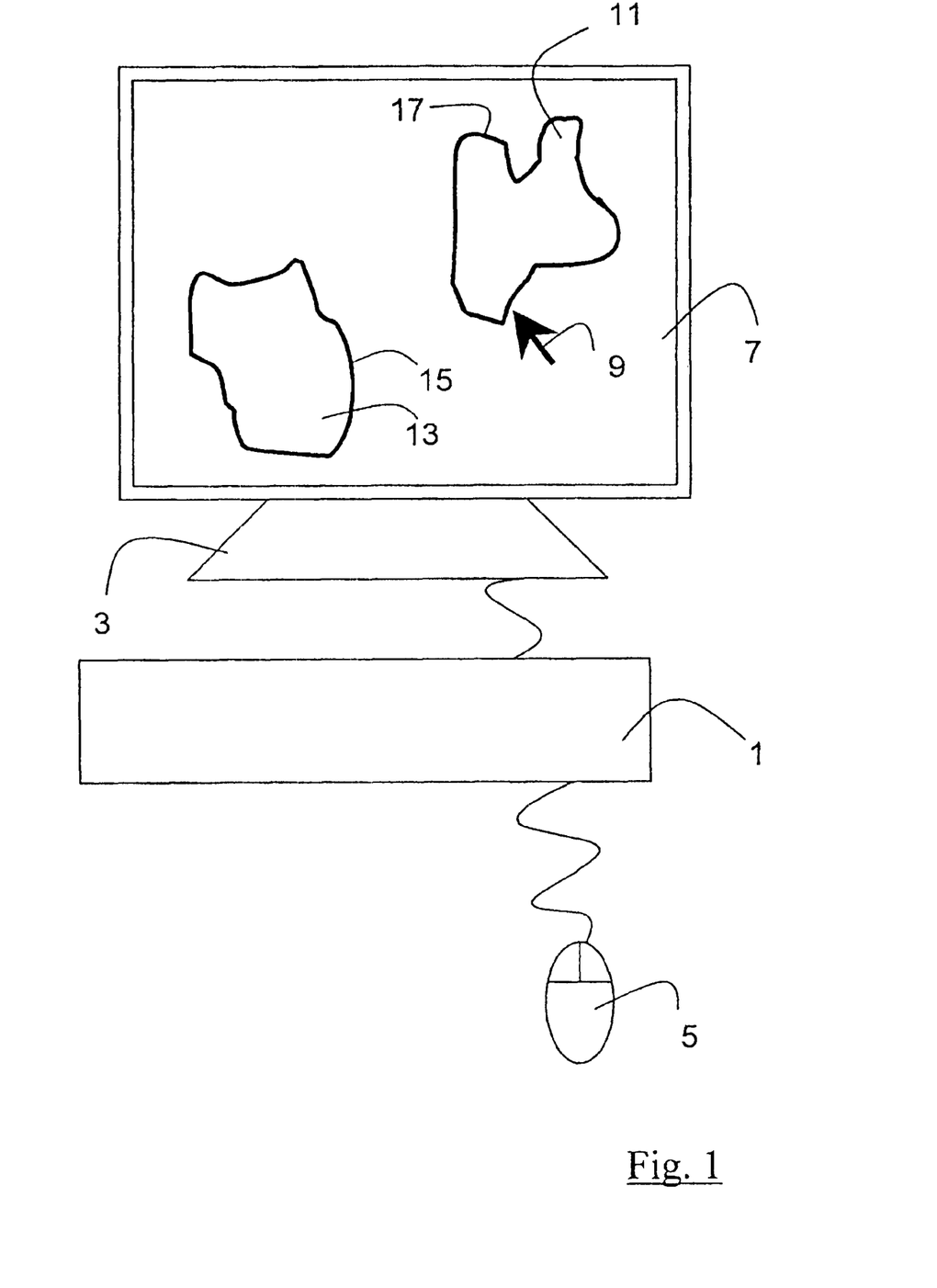
FIG. 1 schematically depicts selection of the regions of interest.

FIG. 1 shows a PC 1 having a monitor 3 and a cursor controller 5. In one embodiment, cursor controller 5 is a computer mouse. Further possibilities for a cursor controller 5 are, for example, a joystick, a trackball, or any other conceivable cursor control device. A preview image 7 of the entire image field 19 is displayed on the monitor. Using the computer mouse, image areas 11, 13 of regions of interest 27, 29 are marked with cursor 9. The marking is displayed in the form of bordering lines 15, 17.

Figure 2:
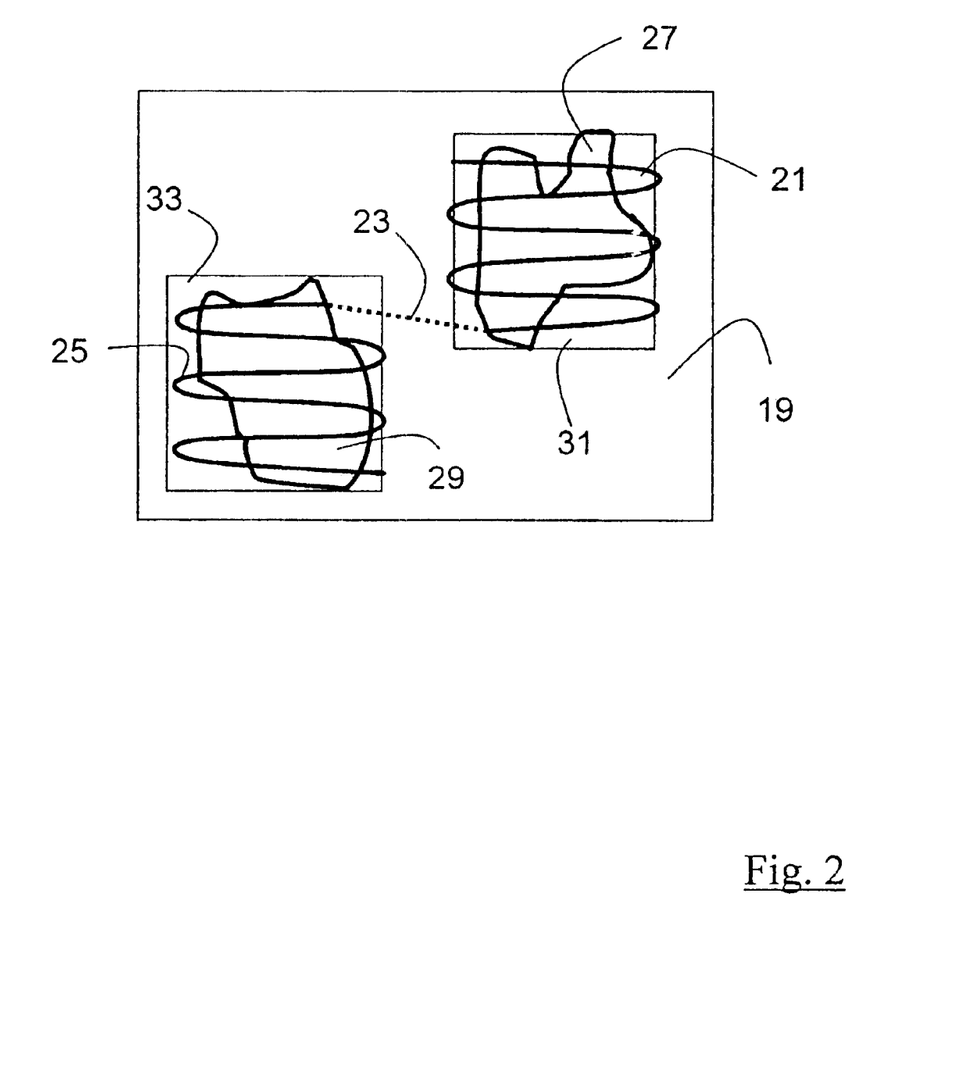
FIG. 2 schematically depicts the shape of the scanning track.

FIG. 2 schematically depicts the shape of the scanning track, which is made up of partial scanning tracks 21, 23, and 25. Partial scanning tracks 21 and 25 are caused by a fast, resonant beam deflection device, whereas partial scanning track 23 is caused by a beam deflection device for specific positioning. Region of interest 27 is traversed by partial scanning track 21, whereas region of interest 29 is traversed by partial scanning track 25. Scan fields 31 and 33 are consequently scanned sequentially. Partial scanning track 23 is swept because of the displacement of scan fields 31, 33 using the second beam deflection device for specific positioning.

Figure 3:
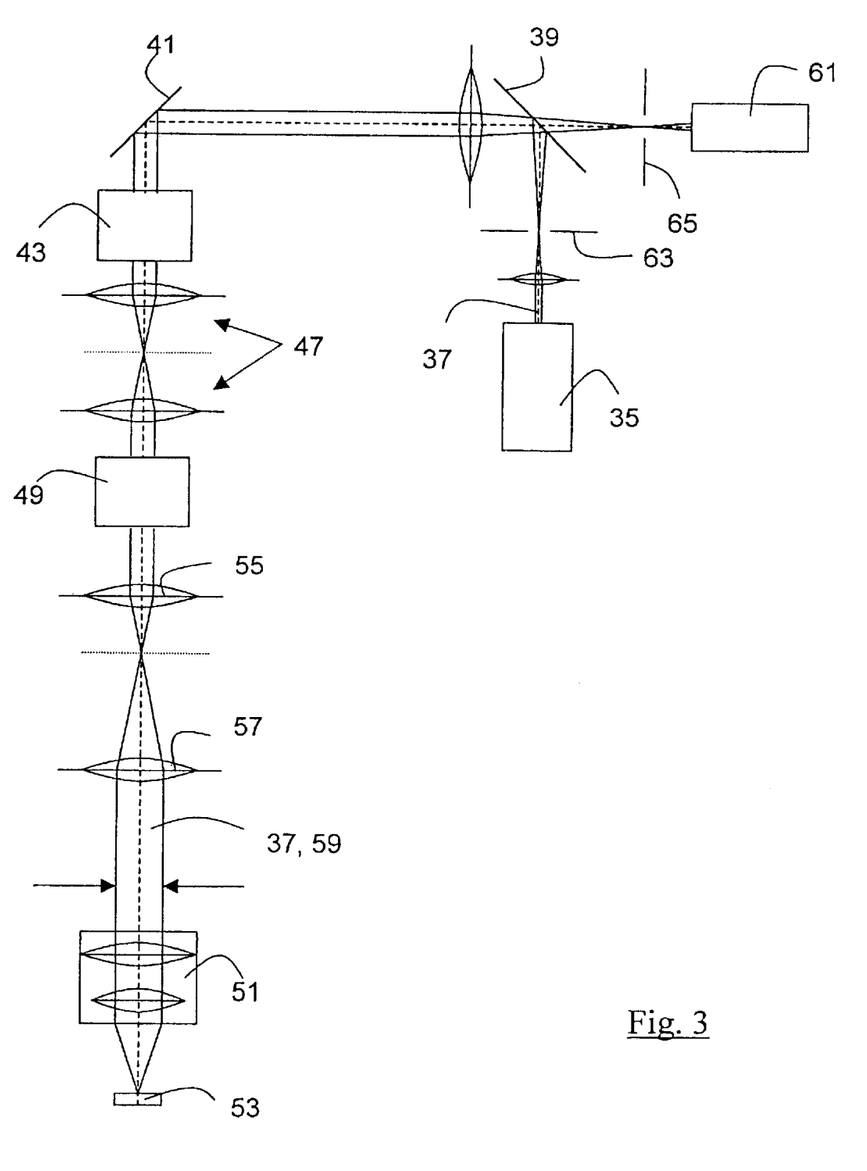
FIG. 3 shows a scanning microscope having the arrangement according to the present invention.

FIG. 3 schematically shows a confocal scanning microscope. Light beam 37 coming from an illumination system 35 is reflected from a beam splitter 39 via deflection mirror 41 to first beam deflection device 43 for specific positioning, which contains a gimbal-suspended scanning mirror (not shown) and serves to displace the scan field in a plane perpendicular to the illumination direction. By way of an intermediate image using an imaging optical system 47 that generates an intermediate focal plane 45, light beam 37 arrives at second beam deflection device 49 which is embodied as a K-mirror (see DE 196 54 210) and contains two resonant galvanometers (not shown). Second beam deflection device 49 provides meander-shaped scanning within the scan field. The size of a scan field can be varied by defining the deflection angle of the galvanometers. Light beam 37 is consequently guided over or through sample 53 via scanning lens 55, optical system 57 and through microscope optical system 51. In the case of nontransparent specimens 15, light beam 37 is guided over the specimen surface. In the case of biological samples (preparations) or transparent samples, light beam 37 can also be guided through sample 53. This means that different focal planes of sample 53 are successively scanned by the focus of light beam 37. Detected light 59 proceeding from sample 53 arrives, on the reverse light path via first and second beam deflection devices 43, 49, back at beam splitter 39, passes through it, and is then detected with detector 61. Detector 61 comprises a photomultiplier that converts the detected light data into electrical signals. Subsequent assembly of the signals and allocation to the respective scan positions then yields a three-dimensional image of region of interest 27, 29 of sample 53. Illumination pinhole 63 and detection pinhole 65 that are usually provided in a confocal scanning microscope are shown schematically for the sake of completeness. Certain optical elements for guiding and shaping the light beams are omitted, however, for better clarity; these are sufficiently known to those skilled in this art.

Figure 4:
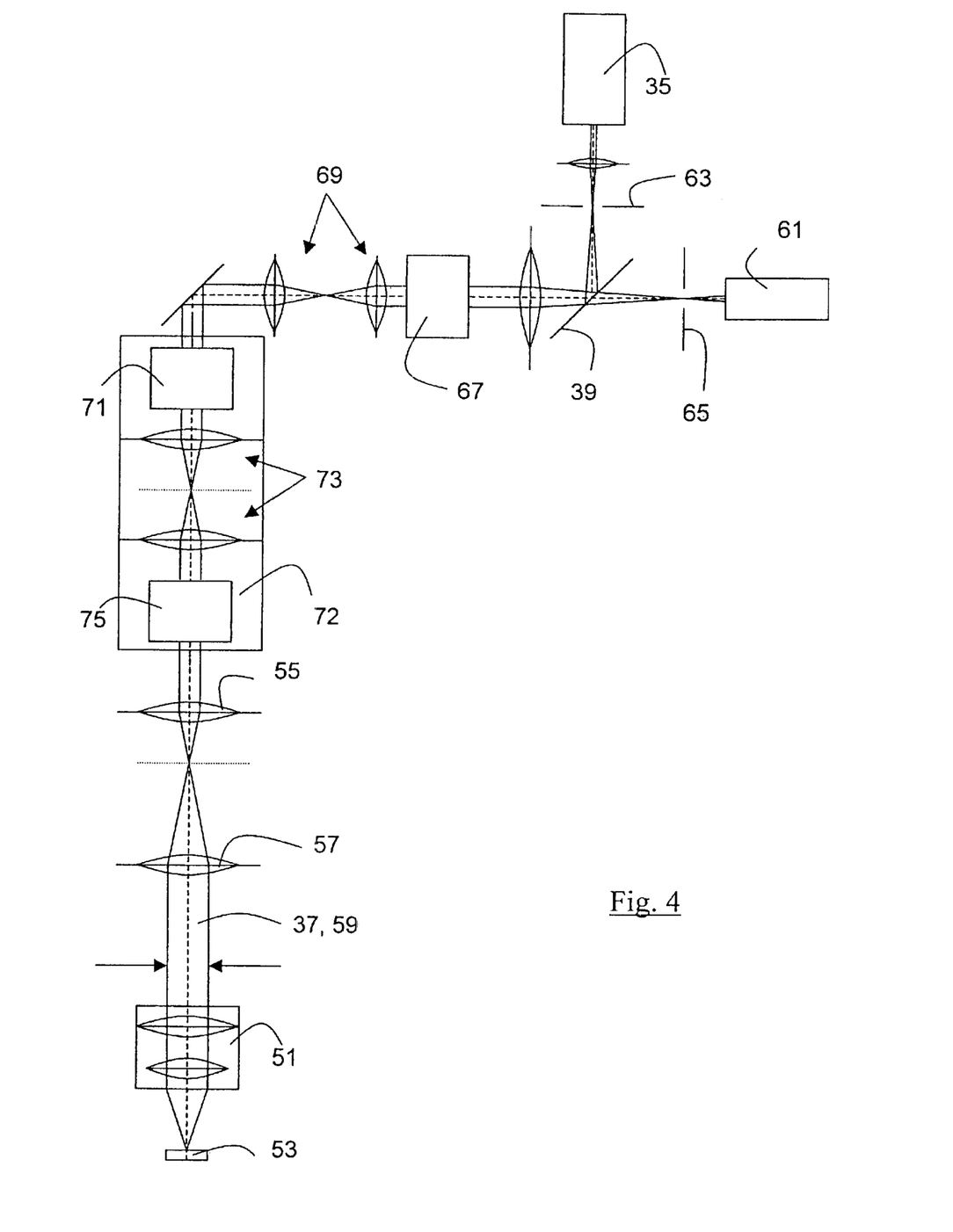
FIG. 4 shows a scanning microscope according to the present invention.

FIG. 4 shows a confocal scanning microscope having a first beam deflection device 67 for specific position. Second beam deflection device 72, which is constituted by a first and a second beam deflection module 71 and 75, is provided for rapid scanning of the scan field. The two beam deflection modules 71 and 75 can, for example, each contain a resonantly oscillating micromirror. Imaging optical systems 69, 73 are provided between first and second beam deflection devices 67 and first and second beam deflection modules 71 and 75 to maintain the telecentric principle.

Figure 5:
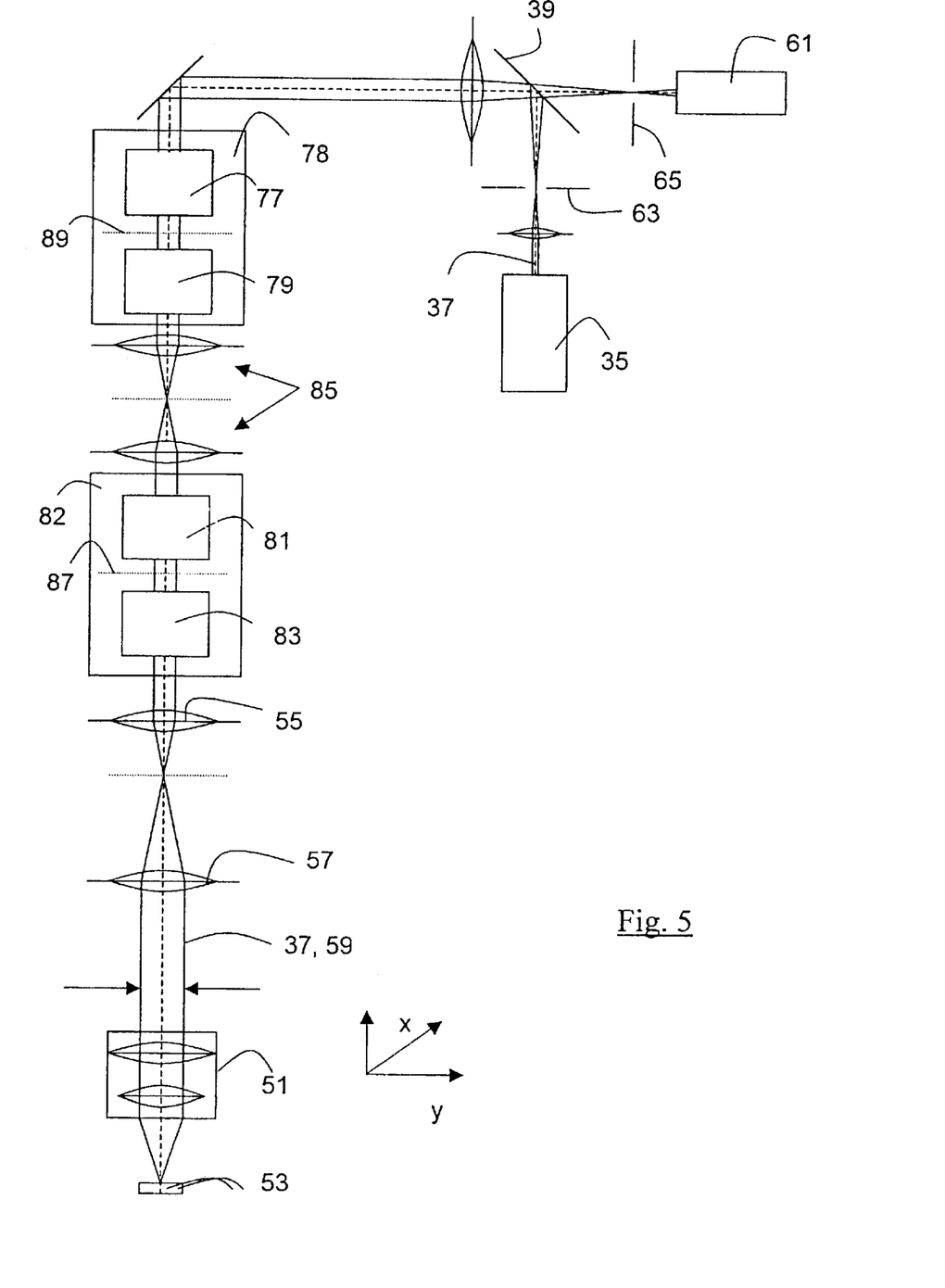
FIG. 5 shows a further embodiment of the scanning microscope according to the present invention.

FIG. 5 shows a confocal scanning microscope having a total of four beam deflection modules 77, 79, 81, 83 that are distributed respectively among two beam deflection devices 78 and 82. Beam deflection modules 77 and 81 deflect in the X direction, whereas beam deflection modules 79 and 83 deflect in the Y direction. Beam deflection device 78 serves to position scan field 31, 33. It contains, for example, galvanometers that operate non-resonantly. Beam deflection device 82 operates resonantly, and serves to scan scan field 31, 33 in meander-shaped fashion. Beam deflection modules 77, 79 and 81, 83 are arranged close to planes 89 and 87, respectively, that are conjugated with the focal plane of microscope optical system 51. Imaging optical system 85 is provided to maintain the telecentric principle.

Figure 6:
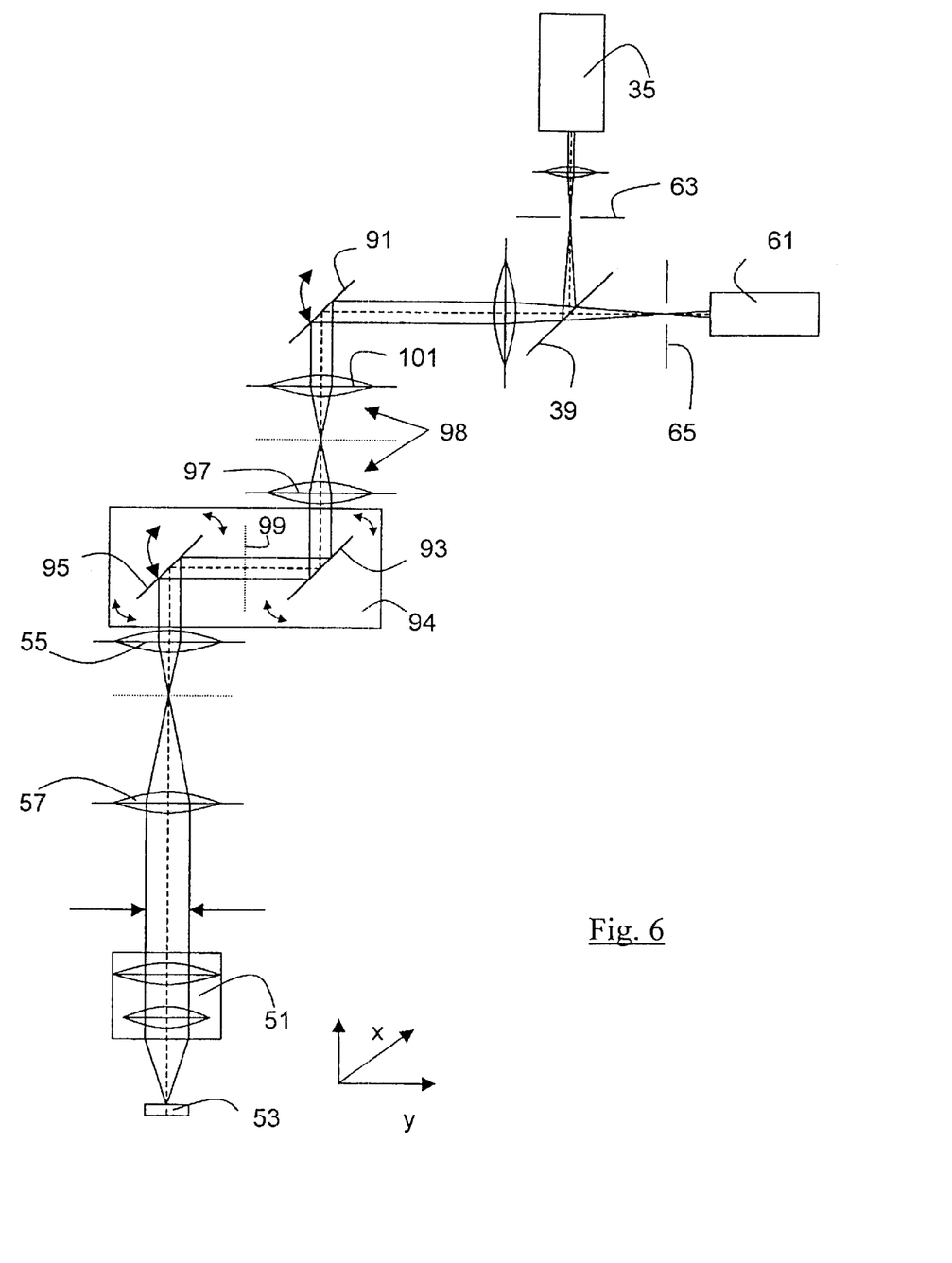
FIG. 6 shows a further embodiment of the scanning microscope having an arrangement according to the present invention.

FIG. 6 shows a further exemplary embodiment of a confocal scanning microscope. Here it is the gimbal-mounted mirror 91, driven in non-resonant fashion, that serves to position scan field 31, 33. In order to maintain the telecentric scanning principle, mirror 93 that deflects in the Y direction and is driven by a resonant galvanometer, and mirror 95 that deflects in the X direction and is driven by a resonant galvanometer, are arranged close to plane 99 conjugated with the focal plane of microscope optical system 51. Imaging optical system 98, which is made up of optical systems 97 and 101 and generates at the rotation point of mirror 91 a further plane 99 conjugated with the focal plane of microscope optical system 51, is located between mirrors 93 and 91. In this exemplary embodiment, second beam deflection device 94 comprises mirrors 93 and 95.

First beam deflection device 43, 67, 78 and/or second beam deflection device 49, 72, 82, 94 contain, inter alia, a gimbal-mounted mirror or a micromirror or an acoustooptical deflector or a galvanometer mirror or a resonantly oscillating mirror system.

The present invention was described with reference to a particular exemplary embodiment. It is, however, self-evident that changes and modifications can be made without thereby leaving the range of protection of the claims recited hereinafter.

Parts List

1 PC
3 Monitor
5 Cursor controller
7 Preview image
9 Cursor
11 Image area
13 Image area
15 Bordering line
17 Bordering line
19 Image field
21 Partial scanning track
23 Partial scanning track
25 Partial scanning track
27 Region of interest
29 Region of interest
31 Scan field
33 Scan field
35 Illumination system
37 Light beam
39 Beam splitter
41 Deflection mirror
43 First beam deflection device
45 Intermediate focal plane
47 Imaging optical system
49 Second beam deflection device
51 Microscope optical system
53 Sample
55 Scanning lens
57 Optical system
59 Detected light
61 Detector
63 Illumination pinhole
65 Detection pinhole
67 First beam deflection device
69 Imaging optical system
71 First beam deflection module
72 Second beam deflection device
73 Imaging optical system
75 Second beam deflection module
77 First beam deflection module
78 First beam deflection device
79 Second beam deflection module
81 First beam deflection module
82 Second beam deflection device
83 Second beam deflection module
85 Imaging optical system
87 Conjugated plane
89 Conjugated plane
91 Mirror
93 Mirror
94 Second beam deflection device
95 Mirror
97 Optical system
98 Imaging optical system
99 Conjugated plane
101 Optical system

What is claimed is:

1. A method for beam control in a scanning microscope comprising the following steps:
   acquiring a preview image, the preview image including a plurality of regions;
   marking at least one region of interest of the plurality of regions;

displacing a scan field onto each of the at least one region of interest by means of a first beam deflection device; and acquiring an image by meander-shaped scanning of each of the at least one region of interest with a second beam deflection device.

2. The method as defined in claim 1, comprising a further step in which the first beam deflection device transfers the meander-shaped scanning of a first of the at least one region of interest into the meander-shaped scanning of a second of the at least one region of interest.

3. The method as defined in claim 2, wherein the meander-shaped scanning of the first and second regions of interest proceeds in accordance with a defined sequence and thereby acquires information from the first and second regions of interest.

4. The method as defined in claim 3, wherein the sequence of the meander-shaped scanning of the first and second regions of interest is user-defined.

5. The method as defined in claim 3, wherein the sequence of the meander-shaped scanning of the first and second regions of interest is performed automatically on the basis of the information obtained from the first and second regions of interest.

6. An arrangement for beam control comprising:

a scanning microscope defining a scan field;

means for acquiring and displaying a preview image, the preview image including a plurality of regions;

a microscope optical system;

means for marking at least one region of interest of the plurality of regions;

a first beam deflection device for displacing the scan field onto each of the at least one region of interest; and a second beam deflection device for meander-shaped scanning within the scan field.

7. The arrangement for beam control as defined in claim 6, wherein the first beam deflection device transfers the meander-shaped scanning of a first of the at least one region of interest into the meander-shaped scanning of a second of the at least one region of interest.

8. The arrangement as defined in claim 6, wherein the second beam deflection device is configured with two beam deflection modules.

9. The arrangement as defined in claim 6, wherein the first beam deflection device is configured with two beam deflection modules.

10. The arrangement as defined in claim 6, wherein the first beam deflection device and second beam deflection device include a gimbal-mounted mirrors, a micromirror, an acoustooptical deflector, a galvanometer mirror or a resonantly oscillating mirror system.

11. The arrangement as defined in claim 6, wherein the first beam deflection device is arranged substantially in the vicinity of a plane conjugated with the focal plane of the microscope optical system.

12. The arrangement as defined in claim 6, wherein the second beam deflection device is arranged substantially in the vicinity of a plane conjugated with the focal plane of the microscope optical system.

13. The arrangement as defined in claim 11, wherein an imaging optical system is provided between the first beam deflection device and second beam deflection device.

14. The arrangement as defined in claim 13, wherein a relay optical system is provided between the first beam deflection device and second beam deflection device.

15. A scanning microscope comprising:

an arrangement for beam control;

means for acquiring and displaying a preview image, the preview image including a plurality of regions;

a microscope optical system;

means for marking at least one region of interest of the plurality of regions;

a first beam deflection device for displacing the scan field onto each of the at least one region of interest; and a second beam deflection device for meander-shaped scanning within the scan field.

16. The scanning microscope as defined in claim 15, wherein the first beam deflection device transfers the meander-shaped scanning of a first of the at least one region of interest into the meander-shaped scanning of a second of the at least one region of interest.

17. The scanning microscope as defined in claim 15, wherein the second beam deflection device is configured with two beam deflection modules.

18. The scanning microscope as defined in claim 15, wherein the first beam deflection device is configured with two beam deflection modules.

19. The scanning microscope as defined in claim 15, wherein the first beam deflection device and second beam deflection device include gimbal-mounted mirrors, a micromirror, an acoustooptical deflector, a galvanometer mirror or a resonantly oscillating mirror system.

20. The scanning microscope as defined in claim 15, wherein the first beam deflection device is arranged substantially in the vicinity of a plane conjugated with the focal plane of the microscope optical system.

21. The scanning microscope as defined in claim 15, wherein the second beam deflection device is arranged substantially in the vicinity of a plane conjugated with the focal plane of the microscope optical system.

22. The scanning microscope as defined in claim 20, wherein an imaging optical system is provided between the first beam deflection device and second beam deflection device.

23. The scanning microscope as defined in claim 22, wherein a relay optical system is provided between the first beam deflection device and second beam deflection device.

\* \* \* \* \*